June 22, 1943.  P. E. VAN DER KIEFT  2,322,403
VEHICLE ATTACHMENT
Filed Feb. 18, 1941  2 Sheets-Sheet 1

INVENTOR
PATRICIA E. VAN DER KIEFT
BY
Donald W. Robertson
ATTORNEY

June 22, 1943.  P. E. VAN DER KIEFT  2,322,403
VEHICLE ATTACHMENT
Filed Feb. 18, 1941  2 Sheets-Sheet 2

INVENTOR
PATRICIA E. VAN DER KIEFT
BY
Donald W. Robertson
ATTORNEY

Patented June 22, 1943

2,322,403

UNITED STATES PATENT OFFICE 2,322,403

VEHICLE ATTACHMENT

Patricia E. Van der Kieft, Darien, Conn.

Application February 18, 1941, Serial No. 379,469

1 Claim. (Cl. 155—10)

The invention relates to a child's seat attachment for automotive vehicles, and more particularly to an auxiliary driver's wheel (or other control device) arranged for mounting in front of the vehicle seat in a position to occupy the attention of the child, and provide a safety guard for him.

It is an object of my invention to provide an attachment for automobiles and the like, constructed and arranged to be removably mounted in a substantially fixed position in the vehicle, and which embodies means for engaging the attention of the child, and which he may hold in his grasp to prevent him from being accidentally thrown from the seat.

It is well known that when a young child occupies the front seat of an automobile, sitting beside the driver, there is danger that he will be thrown forward against the instrument panel or windshield of the car when the brakes are suddenly applied, as may occur during an attempt to avoid collision. In such a situation the driver himself is protected by his hold on the steering wheel, as well as by means of bracing himself against the brake pedal and the inclined forward portion of the car floor. Some protection is afforded, also, for an adult person sitting beside the driver, who can brace himself against the inclined part of the floor. In the case of the child, however, there is nothing to keep him from being thrown forward or to one side upon sudden stops or lurchings of the car. In order to guard against this hazard in the case of very small children, safety seats or straps have been devised. These devices are not suitable, however, for children approaching school age. Accordingly, it is a further object of my invention to provide a safety device which can be used for children who are too old for ordinary safety seats.

A further object of my invention is to provide a combined safety device and educational toy for removable attachment in substantially fixed relationship to the seat of an automobile.

A further object is to provide an auxiliary seat for automotive vehicles which embodies a steering wheel element or other control device arranged in a position to be firmly grasped by a child using the seat.

Other objects and advantages will appear as the description proceeds. In the drawings, which specifically illustrate certain preferred embodiments of the invention:

Figure 1:
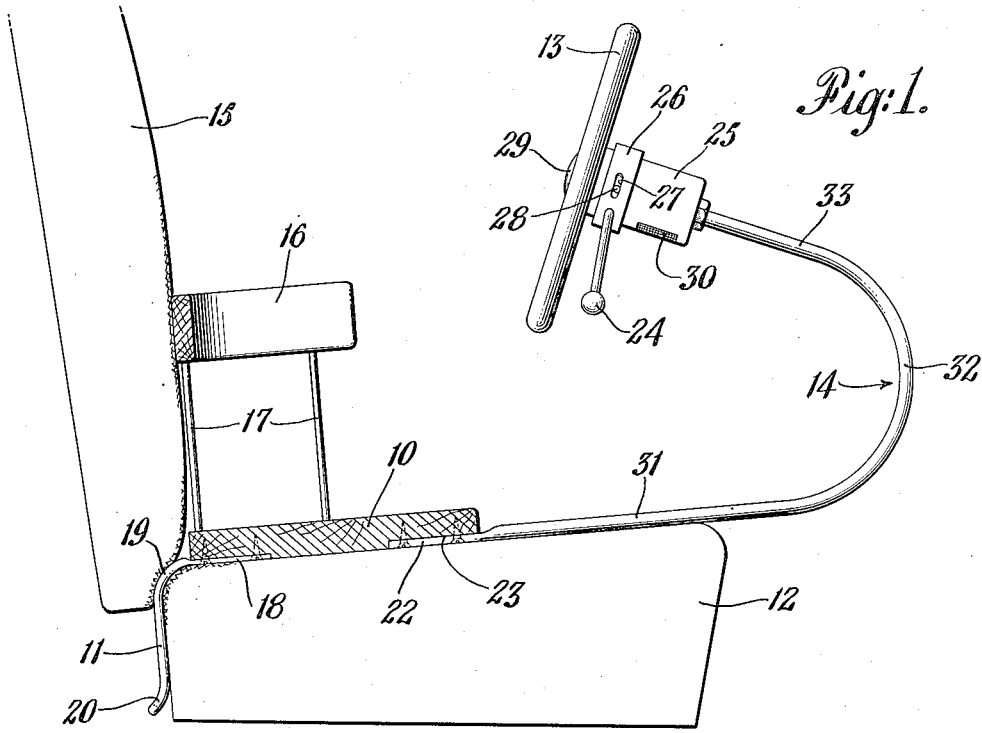
Fig. 1 is a side elevational view, partly in section, of a device embodying my invention in one of its preferred forms. In this view, the device is shown as secured in place on an automobile seat.
Figure 2:
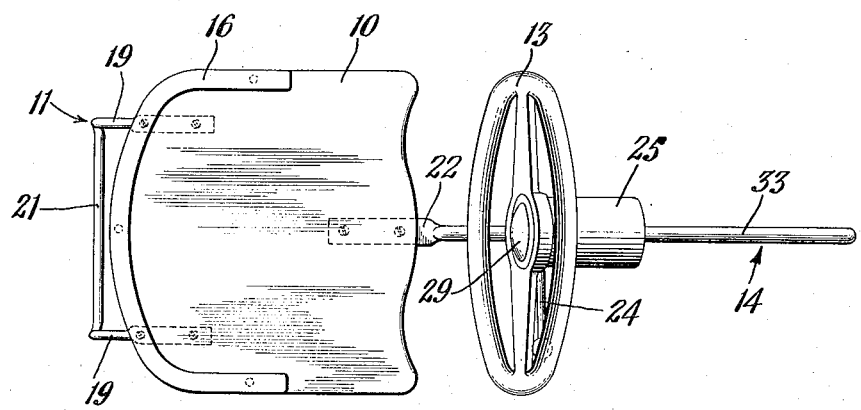
Fig. 2 is a plan view of the same attachment.

Referring to Figs. 1 and 2, I have shown an attachment which comprises a seat member 10 having securing means, such as the bracket 11, for mounting said seat member in association with a seat element 12, which may be the cushion of the usual automobile seat. A simulated steering wheel 13 is secured to the seat 10 by means of a rod or bracket 14 which holds the steering wheel in a position to provide a safety guard at the front of the vehicle seat, a portion of the back of which is shown at 15. If desired, the attachment may also embody a back and arms to provide further support for the child. In the embodiment illustrated, there is a curved member 16 which forms a back and arms for the auxiliary seat 10, and which may be secured thereto in any convenient manner, as by means of the supporting rods 17.

The attaching bracket 11 may conveniently consist of a rod bent to conform with the back of the seat cushion 12, and terminating in flattened end portions 18 which may be attached to the base of the seat 10 by means of screws, or in any other suitable manner. The bracket 11 is provided with curved portions 19 fitting over the back of the seat portion 12, and downwardly extending portions which may terminate in outwardly curved portions 20 joined by a bottom portion 21, the design of the bracket 11 being such as to permit its ready insertion between the rear of the seat 12 and the lower end of the back 15. The rod or bracket 14 preferably terminates at its lower end in a flattened portion 22, which may be set into a recess 23 formed in the under side of the seat member 10 to which the flattened portion 22 is secured, as by means of screws.

In my preferred embodiment, the wheel 13 is supplemented by other simulated vehicle control devices, such as the gear shift lever 24, which may conveniently be mounted on a casing 25 at the upper end of the bracket 14, as by means of a collar 26 oscillatably mounted on said casing. Thus I have shown, by way of example, the collar 26 provided with a slot 27 having a guiding engagement with pin 28 secured to the casing 25, the gear shift lever 24 being secured to the collar 26 in any suitable manner. The casing 25 provides accommodation for a dry cell battery and horn element actuated by the horn button 29, the sound of the horn emerging through a grille 30 at the under side of the casing 25. It will be understood, of course, that the details of the arrangement of the horn and gear shift lever are subject to considerable variation, and that my invention is not limited in this respect to the exact features illustrated. The bracket 14 preferably has a straight portion 31 which follows along in line with the seat and projects out beyond the front of the seat cushion 12, so that the feet and legs of an older child can straddle it easily, and to make it easy for the child to get in and out of the seat. The straight portion 31 of the bracket 14 joins an upwardly and rearwardly curving portion 32, which in turn joins a straight portion 33 simulating the steering column of an automobile.

Figure 3:
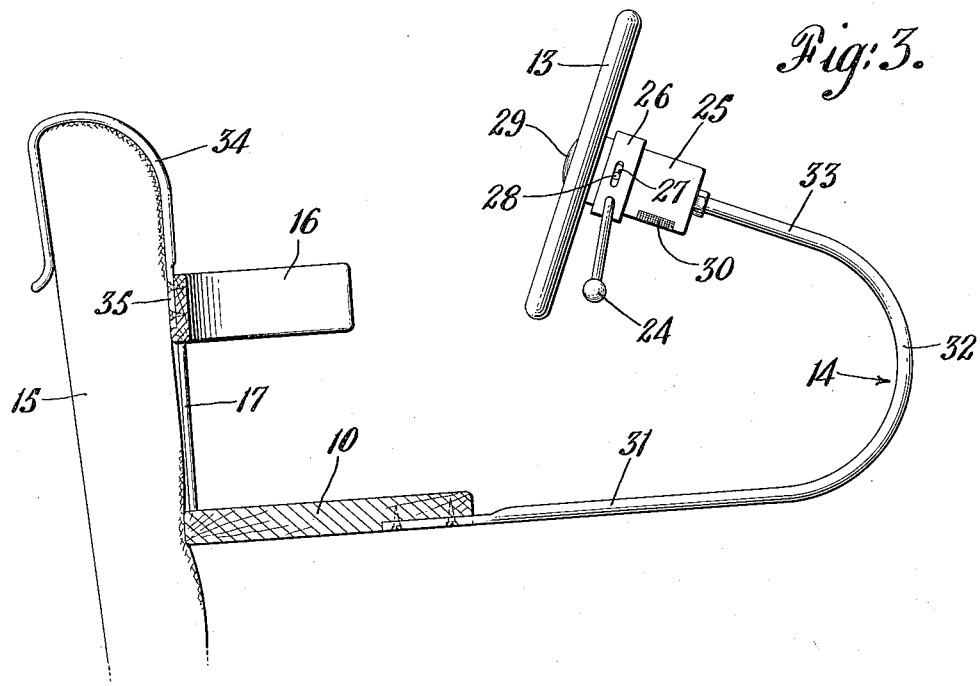
Fig. 3 is a view similar to Fig. 1, but showing a modified construction for attachment to the back of the vehicle seat.

In Fig. 3 I have illustrated a modified form of mounting in which the device, instead of being hooked over the back of the seat cushion, is provided with a supporting element adapted to be hooked over the top of the back 15 of the seat. This supporting element may consist of a bracket, or pair of brackets, 34 secured to the seat 10 or to the back and arm structure 16 thereof. The bracket 34 preferably is provided with flattened end portions 35 which are recessed into the back of the auxiliary seat. In this embodiment, the construction of the steering wheel and gear shift mounting may be the same as has been described with reference to Figs. 1 and 2. The seat 10, being supported some distance above the seat cushion, affords the child a clear view through the windshield of the car, so that he can imagine himself driving the car and will be deterred from grasping the regular controls of the automobile. Ordinarily, the child can be expected to busily engage himself in following the movements of the driver of the car, and in doing this he will, of course, be holding on to the control devices so that, in the event of a sudden stop or lurch of the car, he will naturally brace himself. His own natural bracing effort will be supplemented by the safety guard provided by the wheel 13, which is so shaped as to be devoid of any projections which could do injury when the child is thrown forwardly thereagainst.

Figure 4:
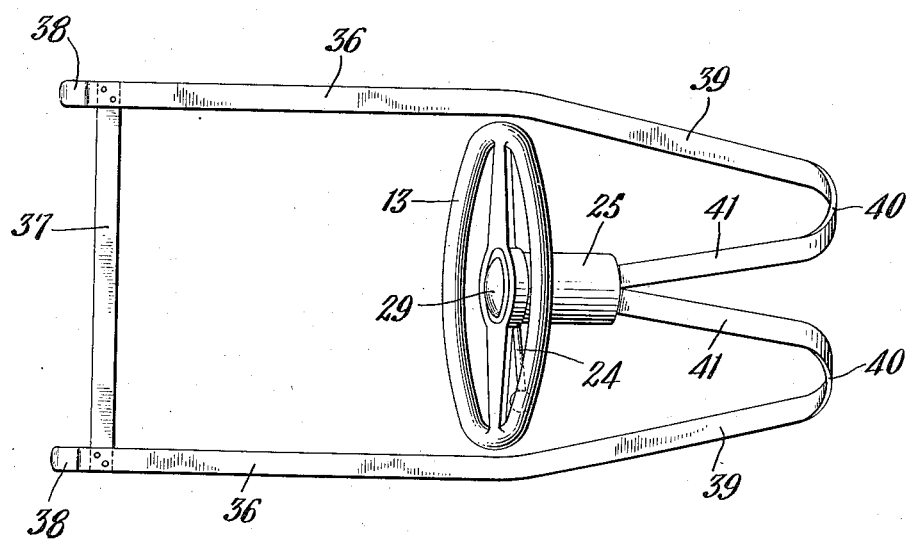
Fig. 4 is a plan view of a further embodiment of the invention in which the seat is omitted so that the child sits directly on the vehicle seat proper.

In Fig. 4 I have illustrated a still further embodiment of my invention in which the auxiliary seat 10 is omitted so that the child sits directly on the cushion of the vehicle seat proper. In this form two side frame members 36 are secured together by a transverse member 37, all of which members may conveniently be made of ordinary strap iron riveted or welded together. The rear ends of the frames 36 are bent downwardly and outwardly to provide integral attaching brackets 38 adapted to slide down in back of the seat cushion 12 in a manner similar to that which has been described in connection with bracket 11 in the embodiment illustrated in Figs. 1 and 2. At their forward ends, the frames 36 are bent inwardly at 39, upwardly at 40 and rearwardly at 41 where they join the base of the casing 25 of the horn and gear shift assembly.

It will be understood that the features which have been described with reference to only one or more of the embodiments described above could be applied to the other embodiment or embodiments as may be desired. The terms and expressions which I have employed are used in a descriptive and not a limiting sense, and I have no intention of excluding such equivalents of the invention described, or of portions thereof, as fall within the purview of the claim.

I claim:

An attachment for automotive vehicles which comprises an auxiliary seat member, means for securing said member to an element of the vehicle seat proper, a supporting member extending forwardly, upwardly and rearwardly from said seat member, and simulated vehicle control means mounted on said supporting member in a position directly above the vehicle seat proper.

PATRICIA E. VAN DER KIEFT.